Patented Dec. 15, 1953

2,662,896

UNITED STATES PATENT OFFICE 2,662,896

REVERSIBLE SOLVENT-SOLUBLE DERIVATIVES OF PHTHALOCYANINE PIGMENTS

Charles John Pedersen, Salem, N. J., assignor to E. I. du Pont de Nemours and Company, Wilmington, Del., a corporation of Delaware No Drawing. Application October 19, 1951, Serial No. 252,188

7 Claims. (Cl. 260—314.5)

This invention relates to novel, solvent-soluble leuco derivatives of metal-free and metal-phthalocyanines. It is an object of this invention to produce novel compounds of the above general class which are characterized by economy of production, stability in storage, and general adaptability for industrial use, as for instance in the dyeing or printing of textile fibers. Various other objects and achievements of this invention will appear as the description proceeds.

It is well known that the phthalocyanines are sensitive to oxidizing agents, which generally disrupt the macrocyclic structure, producing phthalimide or related degradation products (Linstead et al., J. C. S., 1934, pages 1033–1038). It has also been known that under special conditions certain colors of the phthalocyanine series may be oxidized to an intermediate, reversible stage. Thus, A. H. Cook (J. C. S., 1938, pages 1763–1778) described certain brown-colored, intermediate oxidation products of iron phthalocyanine when the latter was brought into contact with hydrogen peroxide or the alpha-peroxide of tetralin. Linstead et al. (J. C. S., 1950, 2981) observed the formation of purple or brown intermediate oxidation products when metal-free phthalocyanine was treated with ceric sulfate in aqueous suspension.

The intermediate, reversible oxidation products thus obtained have different solubility characteristics than the generally insoluble parent materials. They have none of the pigment properties of the initial material, having exchanged the characteristic intense reddish-blue to greenish-blue color of the phthalocyanine pigment for an unstable violet color in some cases, or a reddish-brown color in others. But unlike the end products of degradative oxidation, the intermediate oxidation stages have the remarkable property of regenerating the original color upon being treated with reducing agents or upon heating.

Linstead et al. suggested a structure for the intermediate oxidation product, which may be expressed by the equation:

$$PcH_2 + O + H_2O \rightarrow PcH_2(OH)_2$$

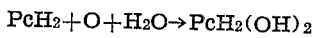

$PcH_2$ in this formula stands for dihydrogen phthalocyanine, that is "metal-free phthalocyanine."

According to Cook, out of 38 metal-phthalocyanines tried besides FePc, all were inactive toward hydrogen peroxide except the phthalocyanines of chromium and cobalt, which were feebly active. None of Cook's reversible oxidation products have apparently been isolated in substance, and Linstead indicated that his products underwent reduction, to regenerate a phthalocyanine color, when an attempt was made to crystallize them from organic solvents.

The idea occurred to me that if the oxidative treatment of phthalocyanines could be modified so as to be applicable to the more common commercial phthalocyanines in the first place, e. g., CuPc or NiPc (Pc standing for the word "phthalocyanine"); to produce readily isolable compounds in the second place, and to enable the entire process to be achieved with economical materials and by an economical procedure, new products of extreme industrial value might be thus produced.

For instance, the new products might be applicable to the dyeing or printing of textile material, by a process which would involve first impregnating the fiber with a solution of the intermediate, essentially colorless, products and then treatment of the fabric with reducing agents or heat to regenerate the color on the fiber. Such a dyeing process would resemble the process of dyeing with vat colors, except that whereas vat colors are reduced to make them soluble and are oxidized to regenerate the color, the reverse is true in the case of the phthalocyanines. Because of this analogy, furthermore, it will be convenient hereafter to refer to the intermediate, reversible oxidation derivatives of the phthalocyanine colors as leuco-phthalocyanine compounds, it being remembered, however, that the leuco-phthalocyanine is an oxidation product whereas the leuco-vat dyes are reduction products.

Now I have found that leuco-phthalocyanine compounds, of valuable, practical qualities, are obtained by treating copper phthalocyanine, and other pigments of the phthalocyanine series with a halogen such as chlorine or bromine in an organic liquid medium containing methyl alcohol. The latter is employed in excess and functions both as a reactant and a solvent.

The reaction is preferably carried out at room temperature, but cooling with ice may be applied, if desired, at the expense of speed of reaction, of course. On the other hand, warming, say up to 50° C., may be resorted to, provided care is taken to avoid undue losses of the halogen, for instance by feeding in the halogen very slowly. Acid binding agents, such as sodium carbonate, potassium carbonate or pyridine, may be used to advantage.

The reaction is believed to introduce a halogen atom into one or more of the outer N-atoms, and a methoxy radical into one adjacent C-atom for each of such halogenated outer N-atoms. HCl or HBr is produced as a by-product and the product, in the simplest case and taking copper phthalocyanine as a typical instance, probably corresponds to the following formula:

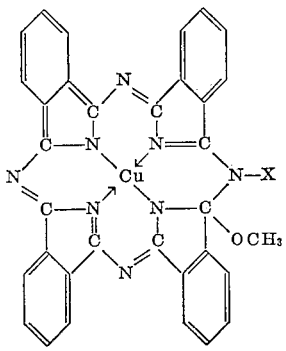

wherein X stands for Cl or Br.

More often, the reaction does not stop at one $X \cdot OCH_3$-pair, and the product is actually a mixture of compounds containing from 1 to 4 such pairs. Consequently, the more general formula for my novel series of compounds may be written

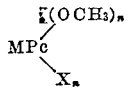

wherein MPc represents the molecule of a metal or dihydrogenphthalocyanine, X stands for chlorine or bromine, while $n$ has a value not less than 1 and not greater than 4.

It is believed that the forces which normally give the phthalocyanine molecule a planar structure are disrupted by the entry of the two substituents indicated (X and $OCH_3$), as a result of which the atoms undergo spatial reorientation, disrupting valence-bond resonance. This theory may account for the radically changed properties of the intermediate oxidation product and for its ready reversibility to the parent material or (in some cases) to metal-free phthalocyanine.

The intermediate leuco-products aforementioned are characterized first of all by loss of the characteristic blue or greenish-blue color of the parent material. The leuco compounds are relatively colorless compared to the parent materials, and they have no tinctorial or pigmentary powers whatever.

Also, whereas phthalocyanines in general are insoluble in most organic solvents, the novel leuco compounds are readily soluble in common organic solvents, such as ethylene-glycol-monoethyl ether, chloroform or acetone, producing generally brown solutions.

They are insoluble in water and, if synthesized in a water-miscible solvent, they may be precipitated out of their reaction mass by drowning the latter in water. They may also be isolated by crystallization or by evaporating the solvent. In solid form, they are sufficiently stable to permit their storage and shipment in commerce for practical, industrial uses.

When heated in dry state or in a suitable solvent they liberate halogen and regenerate the original phthalocyanine material, in the case of those phthalocyanines which are stable as to their metal content, for instance Cu, Cr, Ni, Co and Fe phthalocyanines. In the case of phthalocyanines, however, which readily lose their metal (as upon treatment with concentrated sulfuric acid), for instance in the case of magnesium or disodium phthalocyanine, the regenerated color is metal-free phthalocyanine. Apparently, the metal in these latter cases has become extracted during the halogen treatment.

The temperature required for regeneration of the color by heating will vary with the nature of the metal in the complex compound, and with the degree of purity of the latter. In some cases it may be as high as 160° to 225° C. The regeneration of color may, however, be also achieved at lower temperatures by treating the leuco compounds with aqueous, alcoholic, or aqueous-alcoholic solutions of reducing agents. As instances of suitable reducing agents may be mentioned sodium sulfide, sodium or potassium sulfite, sodium or potassium bisulfite, sodium hydrosulfite, zinc formaldehyde sulfoxylate, stannous chloride, sulfur dioxide, hydriodic acid, ascorbic acid, hydrozine hydrate, and hydroxylamine.

Because of the above characteristic reversible properties, my novel compounds are useful in the dyeing or printing of textile fibers, as more fully discussed and illustrated in the examples hereinbelow.

Without limiting my invention, the following examples are given to illustrate my preferred mode of operation. Parts mentioned are by weight.

*Example 1*

50 parts of finely divided copper phthalocyanine in alpha crystalline form (produced by acid pasting) were placed in a mixture of 250 parts of methanol and 750 parts of benzene. 13.5 parts of bromine were added and the mixture was agitated rapidly for sixteen hours at 26° C. Unchanged copper phthalocyanine was removed by filtration and the filtrate evaporated in vacuo at 40° C. A brown solid product was obtained.

This product was found capable of brominating 2,6-dimethyl-naphthalene in one of the methyl groups, a reaction characteristic of N-bromosuccinimide and similar compounds, thus indicating that the bromine is attached to a nitrogen atom in the phthalocyanine ring.

*Example 2*

A mixture of 10 parts of semi-chloro copper phthalocyanine in finely divided form in 500 parts of methanol was agitated rapidly and treated with 1.6 parts of chlorine at 26° C. for thirty-four minutes. Unchanged copper phthalocyanine was removed by filtration. The filtrate contained 5.7 parts of the leuco phthalocyanine derivative in solution. This material was isolated by drowning the clear filtrate in water and filtering off the precipitate which formed. Upon reduction for fifteen minutes with 2 parts of sodium hydrosulfite in 20 parts of boiling 50%-methanol, it yielded 2.5 parts of copper phthalocyanine.

*Example 3*

One part of zinc phthalocyanine in finely divided form was placed in 100 parts of methanol and treated with 0.2 part of chlorine at 25° C. for two hours. The mass was then filtered to remove unchanged pigment, and the filtrate obtained was of a yellowish brown color indicating the presence of the leuco-oxidation product of zinc-phthalocyanine. Upon addition to this filtrate of 1 part of ascorbic acid and boiling for 15 minutes, a precipitate of zinc-phthalocyanine was formed.

If metal-free or cobalt phthalocyanine is substituted for the zinc phthalocyanine in this example, the corresponding intermediate reversible oxidation products of metal-free or cobalt phthalocyanine is produced.

*Example 4*

Sixty parts of finely divided copper phthalocyanine in the alpha form and 10 parts of potassium carbonate were slurried in 600 parts of "Cellosolve" (glycol-monoethyl ether). A solution of 7.8 parts of chlorine in 200 parts of methanol at 5° C. was added over a period of 30 minutes. The mixture was stirred at 20° C. for 1 hour and then filtered. The brown filtrate was drowned in 10 volumes of water, and the yellow-brown precipitate which formed was isolated, washed and dried at room temperature.

*Example 5*

Fifteen parts of very finely divided monochlorocopper phthalocyanine in the alpha form were slurried in 250 parts of ethylene glycol-monoethyl ether. 5 parts of anhydrous potassium carbonate were added and then, over thirty minutes, a solution of 1½ parts of chlorine in 100 parts of methanol was added. The reaction mass was agitated rapidly during the period of addition of the chlorine solution and for 2½ hours thereafter. The reaction temperature was 25° C. After filtration to remove unchanged pigment, the filtrate, which was reddish-brown in shade, was poured into 3000 parts of water. The precipitate which formed was filtered off, washed with water, and dried without heating.

When reduced at 100° C. in 40 parts of ethylene glycol-monoethyl ether with 1 part of ascorbic acid, 0.775 part of the above product gave 0.529 part of monochloro copper phthalocyanine.

*Example 6*

Ffity parts of metal-free phthalocyanine in the alpha form and 5 parts of potassium carbonate were placed in 400 parts of ethylene glycol-monoethyl ether and milled with ceramic balls until the average particle size of the phthalocyanine was 1 micron or less. A solution of 15.6 parts of bromine in 100 parts of methanol was then added and the mixture was milled for 3 hours more. After filtration to remove unchanged pigment, the brown solution of the leuco phthalocyanine was drowned in 10 volumes of water. The yellow-brown product thus obtained was separated, washed with water and dried without heating. Twelve parts of the leuco compound were thus obtained.

It will be understood that the details of the above examples may be varied within considerable limits, as indicated in the general discussion. Thus, in lieu of methyl alcohol by itself, mixtures of methyl alcohol with other common organic solvents which are non-reactive to halogen, for instance benzene or chloroform, may be employed. Ethylene-glycol monoethyl ether may also be used; although this reagent reacts slowly with chlorine, it has the advantages that the initial phthalocyanine pigments disperse in it readily and that the leuco-phthalocyanine compounds formed are highly soluble in this solvent. The quantity of methyl alcohol nevertheless should be in excess of the stoichiometric, and should preferably be at least equal in weight to the weight of pigment being treated.

The process may be applied to metal phthalocyanines other than CuPc, for instance those of Co, Ni, Cr, Fe, Mg and Na, as well as to metal-free phthalocyanine. When magnesium and disodium phthalocyanines are employed, the metal drops out during the oxidation step, and the intermediate leuco compound yields metal-free phthalocyanine upon regeneration.

Reduction to yield phthalocyanines may be accomplished with numerous reducing agents. At 100° C. or above, in aqueous "Cellosolve" (monoethyl ether of ethylene glycol), few agents fail to reduce the phthalocyanine oxidation products. Most agents function at room temperature. The temperature and preferred time of reduction with a given agent will vary depending upon the metal M in the pigment. The oxidation products of cobalt phthalocyanine reduce more slowly than the oxidation products of copper phthalocyanine, for example.

For best results, good contact should be afforded between the reducing agent and the phthalocyanine oxidation product. Another important factor is the degree of fineness and uniformity of the pigment particles used as starting material. Thus, although the crudes of many phthalocyanines having relatively coarse particles react poorly, the corresponding phthalocyanines that have been reduced to pigmentary state by treatments such as acid pasting or salt-milling react much better.

The following additional examples will illustrate the procedure in reduction and will exemplify further the application of my novel compounds to practical industrial problems:

*Example 7.—Regeneration of CuPc pigment in substance*

9.23 parts of the oxidation product produced in Example 4 were dissolved in 150 parts of "Cellosolve" and treated at 100° C. for 15 minutes with 10 parts of ascorbic acid dissolved in 150 parts of "Cellosolve." The blue precipitate of copper phthalocyanine which formed was filtered off and dried. 4.78 parts of pigment were thus obtained.

*Example 8.—Dyeing of textile fiber*

A 5% solution in "Cellosolve" of the product of Example 4 was padded on cotton piece goods which had been swollen by boiling first in water for 5 minutes and then in "Cellosolve" for 15 minutes followed by air drying. The padding was then placed, for 20 minutes, in a boiling 5% aqueous solution of potassium ferrocyanide, removed and placed in a boiling 5% aqueous solution of lactic acid for a further 20 minutes. Next, the padding was soaped for 15 minutes at 180° F. in an 0.5% soap solution. The result was a strong, bright blue dyeing of good fastness properties.

*Example 9.—Printing of fabric*

A printing paste is prepared as follows:

| | Parts |
|---|---|
| Copper phthalocyanine oxidation product as obtained in Example 4 hereinabove | 4 |
| Urea | 10 |
| "Carbitol" (monoethyl ether of diethylene glycol) | 10 |
| Water | 16 |
| Gum-tragacanth, 6% aqueous paste | 50 |
| Sodium sulfite | 5 |
| Sodium bisulfite | 5 |
| | 100 |

The color is then developed by ageing the printed goods for thirty minutes in a cottage steamer. The aged prints are rinsed in water, then soaped, again rinsed in water and finally dried.

The prints obtained exhibit the deep blue shade of copper phthalocyanine. They are very fast to light, do not crock, and are fast to wet treatments including the application of bleaching agents such as sodium hypochlorite.

When the copper phthalocyanine oxidation product in the above process is replaced by the analogous oxidation products described in Examples 2 and 5 hereinabove, similar results are obtained.

I claim as my invention:

1. Compounds of the general formula

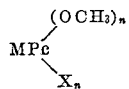

wherein MPc designates the molecule of a phthalocyanine compound of the group consisting of metal-phthalocyanines and metal-free phthalocyanine, X is a halogen selected from the group consisting of chlorine and bromine, while $n$ is a subscript not less than 1 and not greater than 4.

2. A compound of the formula

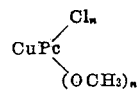

wherein CuPc designates the molecule of copper phthalocyanine, wherein the Cl atom is attached to an N-atom while the OCH$_3$ group is attached to a C-atom adjacent to said N-atom, and wherein $n$ has a value not less than 1 and not greater than 4, said compound being characterized by its solubility in ethylene-glycol-monomethyl ether, and by its capacity to regenerate copper phthalocyanine upon being treated with an alcoholic solution of ascorbic acid.

3. The process of producing a reversible, leuco derivative of a phthalocyanine coloring matter, which comprises reacting the same with methyl alcohol and a halogen selected from the group consisting of chlorine and bromine.

4. The process of producing an intermediate, leuco, derivative of copper phthalocyanine, capable of generating copper phthalocyanine upon treatment with ascorbic acid, which comprises reacting upon copper phthalocyanine with a halogen of the group consisting of chlorine and bromine in the presence of methyl alcohol, and recovering the leuco compound from the reaction mass by drowning the latter in water.

5. A process according to claim 3, reaction being effected in the presence of an acid-binding agent.

6. A process as in claim 4, the reaction being effected in the further presence of an acid-binding agent.

7. The process of producing a phthalocyanine coloring matter, which comprises reacting upon a compound as defined in claim 1 with a reducing agent selected from the group consisting of the alkali-metal sulfides, sulfites, bisulfites and hydrosulfites, zinc formaldehyde sulfoxylate, stannous chloride, sulfur dioxide, hydriodic acid, ascorbic acid, hydrazine hydrate, and hydroxylamine.

CHARLES JOHN PEDERSEN.

References Cited in the file of this patent

Adams et al., Organic Reactions, vol. 6, p. 482 (1951).